United States Patent Office 3,848,049
Patented Nov. 12, 1974

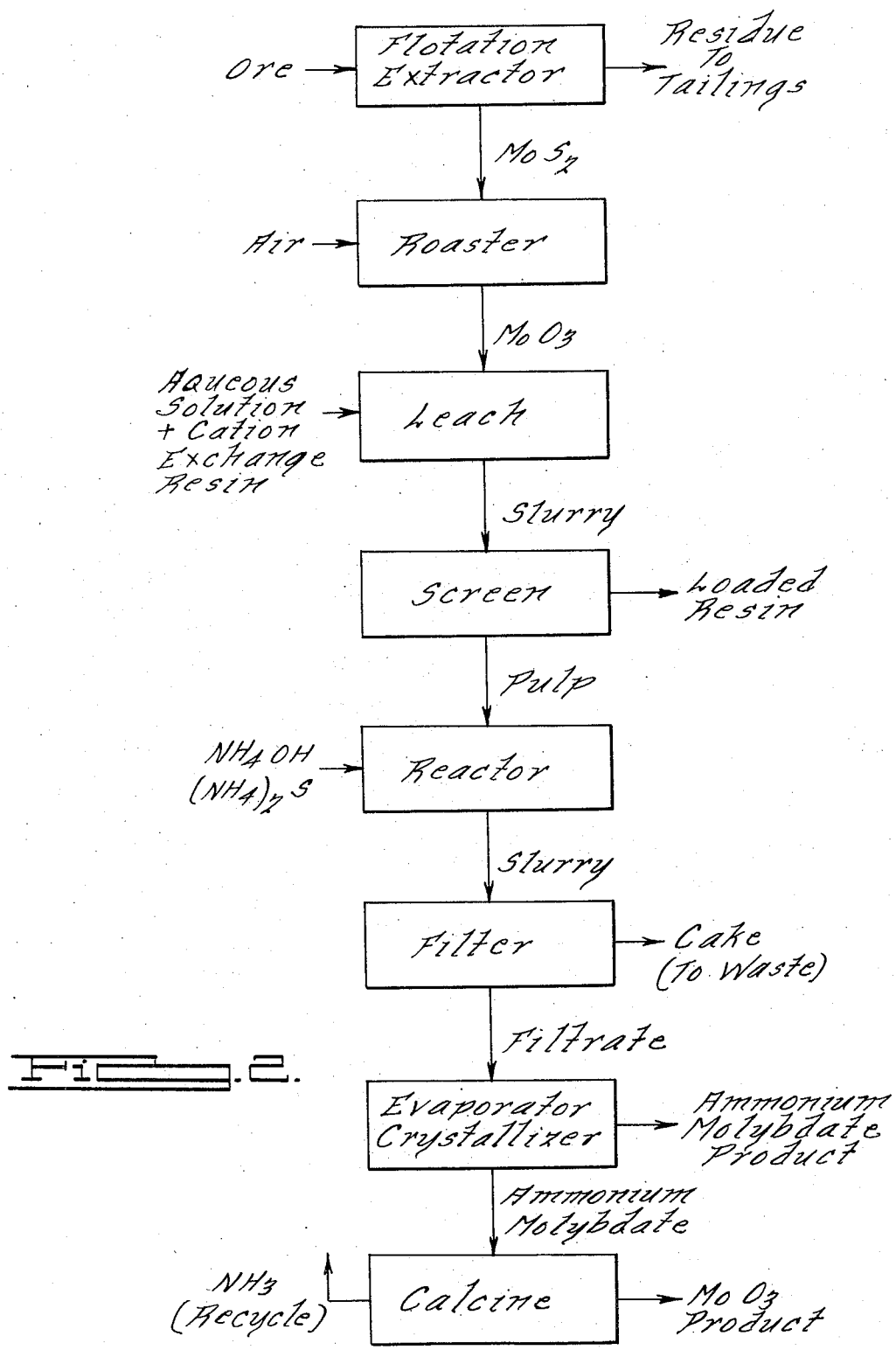

3,848,049
PROCESS FOR PRODUCING HIGH PURITY MOLYBDENUM OXIDE AND AMMONIUM MOLYBDATE
Richard A. Ronzio, Golden, Colo., Herbert Kay, New York, N.Y., and John D. Vincent, Golden, Colo., assignors to American Metal Climax, Inc.
Filed Jan. 27, 1972, Ser. No. 221,257
Int. Cl. C01g 39/00
U.S. Cl. 423—54                                        11 Claims

ABSTRACT OF THE DISCLOSURE

A process for producing a high purity ammonium molybdate and/or molybdenum trioxide product in which molybdenum disulfide is extracted from molybdenite ore by flotation extraction operations providing a concentrate which thereafter is roasted in an excess of air to produce a molybdenum oxide roasted concentrate containing impurities. The roasted concentrate is thereafter subjected to an aqueous leaching and the filter cake is subjected to an ammonium hydroxide leaching step to form ammonium molybdate which can be recovered by recrystallization or, alternatively, can be calcined to produce a substantially pure molybdenum trioxide product. The filtrate from the aqueous leaching operation is treated to recover any solubilized molybdenum. In an alternative embodiment, a particulated cation exchange resin is employed in the initial aqueous leaching step to effect a preferential extraction of other contaminating constituents in the roasted concentrate.

BACKGROUND OF THE INVENTION

Molybdenum is principally found in the earth's crust in the form of very fine veinlets in quartz, present in an ore body comprised predominantly of an altered and highly silicified granite. The molybdenum constituent in such ore bodies is in the form of molybdenite ($MoS_2$) and is present in concentrations of about 0.5% by weight. The molybdenite is in the form of relatively soft, hexagonal, black flaky crystals which can be extracted and concentrated by any one of a variety of known beneficiation processes so as to increase the molybdenum disulfide content to a level usually greater than about 80% by weight of the concentrate. The resultant concentrate is usually subjected to an oxidation step in which the $MoS_2$ is converted to an oxide and whereafter the oxide is further refined to form a resultant molybdenum trioxide product or molybdate compound of a desired purity and concentration.

Conventionally, molybdenite ores as mined contain various impurities in varying concentrations depending upon the particular source of the molybdenite ore. Among such impurities are lead, iron, zinc, bismuth, calcium, aluminum, potassium and copper, along with silica, which comprises the predominant contaminating constituent. While a number of processes have heretofore been used or proposed for use to effect a removal of the predominant amounts of such contaminating impurities, such processes have usually been unsatisfactory in one or more respects, rendering them unsuitable for adoption on a commercial scale for catalysts or molybdenum metal production. Generally, the major deterrent of such prior art processes has been the costs attending the upgrading of the molybdenite concentrates, whereby the resultant molybdenum trioxide or molybdate compound produced was objectionable from an economic standpoint.

In accordance with the process comprising the present invention, it is now commercially feasible to effect a conversion of a molybdenite concentrate to the corresponding molybdenum oxide or molybdate compound while concurrently effecting an extraction and removal of the predominant portion of objectionable contaminating constituents therein, providing a relatively pure up-graded molybdenum product at reasonable cost.

SUMMARY OF THE INVENTION

The advantages and benefits of the present invention are achieved by a process in which a molybdenite containing ore is concentrated, such as by a flotation extraction operation, to produce a molybdenum disulfide concentrate which contains at least about 85% and preferably at least about 93% by weight molybdenum disulfide. The molybdenite concetnrate produced is subjected to a roasting operation to produce a roasted concentrate composed predominantly of molybdenum trioxide. An extraction of portions of contaminating constituents from the roasted concentrate is achieved by subjecting the concentrate to a hot aqueous leaching operation which can be performed by employing water, as well as a dilute nitric acid solution, to facilitate a selective solubilizing of the contaminating constituents. At the completion of a prescribed leaching cycle, the aqueous leaching solution is separated from the remaining solids and is subjected to further processing for recovering the small quantity of molybdenum which may have become solubilized therein. This conveniently can be achieved by contacting the aqueous leach solution with a controlled amount of lime to produce calcium molybdate which precipitates and can be recovered such as by filtration.

The solid concentrate remaining after the aqueous leaching step is subjected to a second leaching operation employing ammonium hydroxide for effecting the dissolving of substantially all of the molybdenum constituents therein. Residual solids remaining after the ammoniacal leaching step are removed, such as by filtration, and after appropriate treatment, can be discharged to waste. The filtrate, which contains substantially all of the original molybdenum constituent in the form of a soluble ammonium molybdate compound or complexes thereof, is thereafter subjected to evaporation and crystallization, producing a high purity ammonium molybdate product. Alternatively, the ammonium molybdate product can be subjected to a further calcining step at a temperature below the sublimation temperature of molybdenum oxide to produce a high purity molybdenum oxide product and the gaseous ammonia liberated during the calcining step can be recycled to the ammoniacal leaching operation.

In accordance with an alternative embodiment of a process comprising the present invention, the initial aqueous leaching operation can be performed in the presence of a particulated ion exchange resin which is operative to preferentially adsorb the solubilized contaminants in the aqueous leach solution. At the completion of the leaching operation, the loaded ion exchange resin can be separated from the aqueous slurry containing the roasted concentrate and the resultant pulp can be directly transferred without separation to the second ammoniacal leaching step as previously described.

Still further advantages and benefits of the present invention will become apparent upon a reading of the description of the preferred embodiments, taken in conjunction with the accompanying drawings.

BRIEF DESCRIPTION OF THE DRAWINGS

FIG. 2 is a schematic flow diagram depicting the essential steps of producing a high purity molybdenum trioxide product or molybdate compound in accordance with an alternative embodiment of the present invention.

DESCRIPTION OF THE PREFERRED EMBODIMENTS

Figure 1:
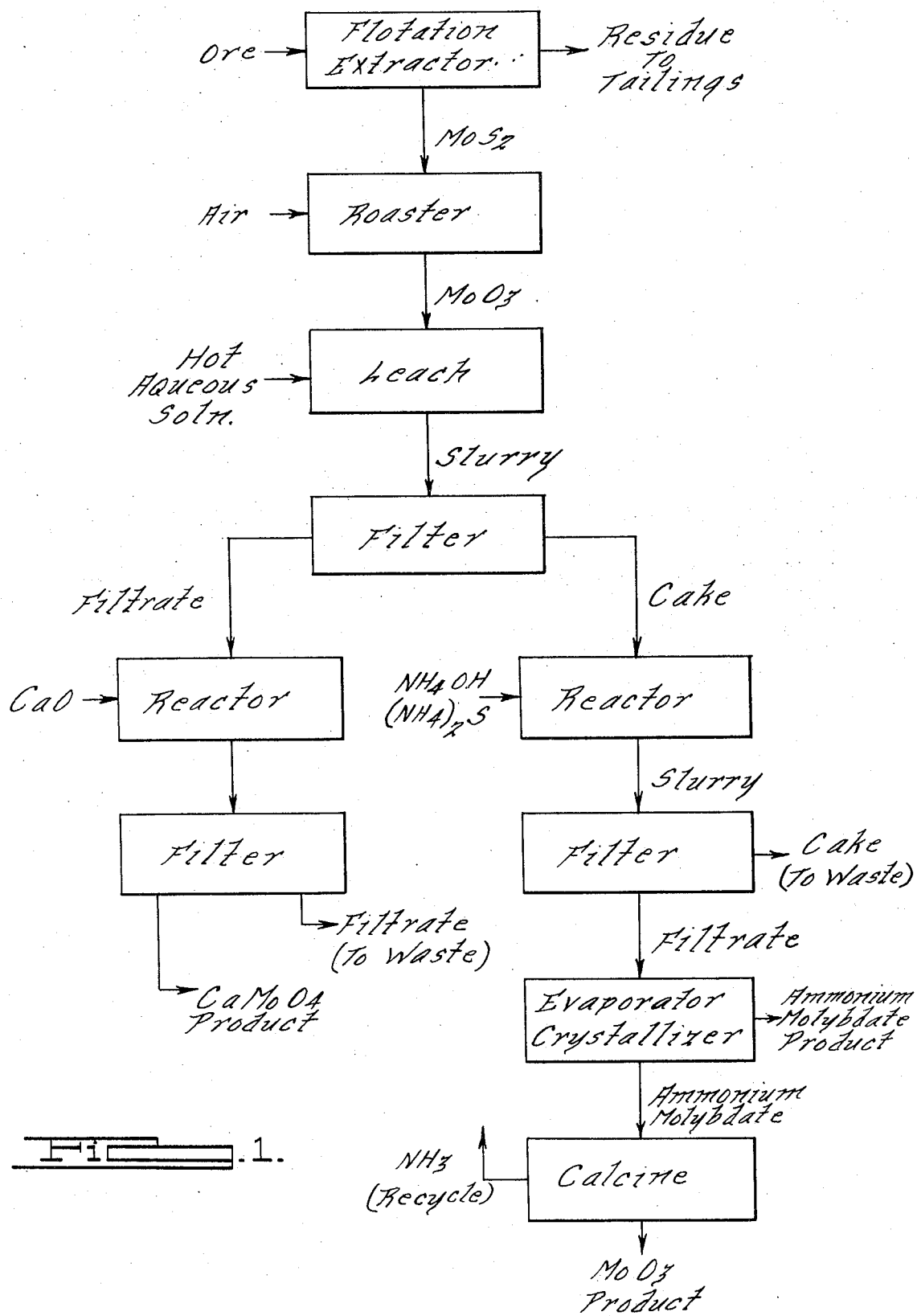
FIG. 1 is a schematic flow diagram of the steps for achieving an extraction and conversion of a molybdenite ore into a high purity molybdenum oxide or molybdate compound in accordance with one of the embodiments of the present invention.

The compositions of the various materials as herein described and set forth in the subjoined claims are defined in terms of percentages by weight, unless expressly indicated to the contrary.

Referring now in detail to the drawings, and as may be best seen in FIG. 1, the molybdenite ore as mined is subjected to an ore flotation extraction step in which the ore is ground to a relatively fine particle size of usually less than about 200 mesh and thereafter the particles, which are composed principally of molybdenite, are extracted from the silicious gangue materials. The flotation extraction operation utilizes a hydrocarbon oil and pine oil in combination with various wetting agents, whereby the particles, comprised predominantly of molybdenum disulfide, are retained in the flotation froth while the gangue materials, comprised predominantly of a silica, remain in the tailing portion of the pulp. The flotation beneficiation operation is usually carried out in a series of successive steps, each including a grinding and a flotation cycle, until the amount of residual gangue in the extracted product is reduced to a level of about less than 10% by weight and preferably less than about 8%. A typical analysis of a molybdenite concentrate, designated as Sample A derived from Climax, Colo., is as follows: molybdenum disulfide—91.3%; Fe—0.3%; Pb—0.026%; Cu—0.035%; Na—0.0125% and K—0.205%. Other samples taken from the flotation operation at various purification levels include a Sample B containing 4.1% nitric acid, perchloric acid insolubles; Sample C with 1.19% acid insolubles; and Sample D containing only 0.4% acid insolubles on an oil and moisture-free basis of the concentrate.

In any event, the resultant concentrate containing at least about 85% molybdenum disulfide on an oil and moisture-free basis, and preferably 93% molybdenum disulfide, is transferred to a roasting operation, as shown in FIG. 1, in which an excess amount of free air is introduced to effect a conversion of the molybdenum disulfide to a corresponding molybdenum trioxide product. The roasting operation is carried out at a temperature broadly ranging from about 600° C. up to a temperature below that at which molybdenum oxide sublimes, and preferably at a temperature of from about 550° C. to about 700° C. The molybdenite concentrate is charged to the roaster which may comprise any one of the multiple-hearth furnaces including those known under the names of Herreshoff, McDougall, Wedge, Nichols, etc. The foregoing furnaces basically comprise a plurality of annular-shaped hearths disposed in vertically spaced relationship on which the molybdenite concentrate being roasted is transferred from the uppermost hearth in a cascading fashion downwardly to the lowermost hearth while being exposed to a countercurrent flow of hot flue gases, effecting a roasting and oxidation of the material to produce molybdenum trioxide.

The roasting operation is carried out so that substantially all of the molybdenum disulfide content of the molybdenum concentrate is converted to an oxide which, in accordance with the process schematically depicted in FIG. 1, is thereafter transferred to a tank in which a leaching of some of the impurities therein is achieved employing a hot aqueous leaching solution. Typical of the chemical composition of roasted concentrate is that derived from the roasting of the Sample A molybdenite concentrate at 600° C. with a free excess of air producing a product containing about 59.05% molybdenum, 380 p.p.m. copper, 530 p.p.m. magnesium, 600 p.p.m. aluminum and 2500 p.p.m. potassium. Chemical analyses of roasted concentrates derived from a roasting of molybdenite concentrates Samples B through D under these same conditions are as follows:

TABLE 1

| Ingredient | Sample B | Sample C | Sample D |
| --- | --- | --- | --- |
| Mo, percent | 62.7 | 62.7 | 63.9 |
| Cu, p.p.m. | 250.0 | 191.0 | 140.0 |
| Mg, p.p.m. | 300.0 | 250.0 | 71.0 |
| Al, p.p.m. | 3,000.0 | 1,400.0 | 800.0 |
| K, p.p.m. | 1,600.0 | 550.0 | 225.0 |

The hot aqueous leaching step is carried out employing water which is heated from a temperature of from about 10° C. up to about 100° C., and preferably from about 20° C. to about 85° C. Alternatively, the aqueous leach solution, in accordance with the embodiment as shown in FIG. 1, may contain a dilute concentration of a mineral acid selected from the group consisting of nitric, hydrochloric, sulfuric and mixtures thereof, of which nitric acid alone constitutes the preferred material. The acid concentration may range from about 1% to as high as about 10% and preferably is within a range of from about 1% to about 5%. The use of nitric acid in the aqueous leach solution facilitates a leaching of some of the contaminating substances including copper, potassium and iron present in the roasted concentrate.

The leaching operation is carried out by forming a slurry of the hot aqueous leach solution with the roasted concentrate at a solids concentration ranging from about 30% up to about 50%, and preferably from about 33% to about 40%. Particularly satisfactory results have been obtained at a liquid-to-solids ratio of about 2:1. The slurry is maintained under agitation and heat is supplied to the leaching receptacle to maintain the slurry at the desired temperature level. The duration of the hot aqueous leaching step will vary depending upon the specific composition of the aqueous leach solution, the amount and type of contaminants present in the roasted concentrate and desired purity of the final product. Contact times during the aqueous leaching operation of about one hour at a solution temperature of about 80° C. have been found satisfactory for removing a predominant proportion of the contaminating metals present without solubilizing a significant quantity of molybdenum present.

The agitated slurry at the completion of the leaching cycle is transferred to a suitable filter and the solid residue in the form of a filter cake containing the predominant portion of molybdenum oxide in the feed is transferred to a reactor for a second leaching with ammonium hydroxide. It is usually preferred to subject the filter cake to a washing with hot water to remove any residual liquid containing the dissolved metal contaminants therein and the wash solution is combined with the filtrate for further processing. The filtrate in turn, as shown in FIG. 1, is transferred to a reactor for the purpose of recovering at least a portion of the valuable molybdate compounds that were dissolved during the hot aqueous leaching operation. The aqueous leach solution, depending upon the particular conditions employed, may contain from about 1% up to about 5% of the molybdenum content originally present in the roasted concentrate feed and this quantity can be selectively extracted from the filtrate by the addition of lime thereto to produce an aqueous insoluble calcium molybdate product. The concentration of lime introduced in the filtrate may range from about two to about three times the stoichiometric amount required. The reaction to effect the conversion and formation of the calcium molybdate product may be carried out at a temperature of about 10° C. to about 100° C., and preferably of around 20° C. After substantially all of the soluble molybdenum oxide has been reacted, the resultant liquid and insoluble precipitate is transferred to a filter, as shown in FIG. 1, and the calcium molybdate recovered in the form of a filter cake which is washed and thereafter dried as a final product. The filtrate, after appropriate treatment, can be discarded to waste.

The ammoniacal leaching step carried out employs an ammonium hydroxide solution which may range in concentration from about 5% up to about 30% $NH_3$ and at a temperature ranging from about room temperature (25° C.) up to about 100° C. Preferably a temperature of the ammoniacal leaching solution is controlled within the range of from about 50° C. to about 75° C. since higher temperatures promote a rapid volatilization of the ammonia constituent therein.

In addition to ammonium hydroxide, the ammonical leach solution may also contain various sulfur compounds for the purpose of forming insoluble precipitates with any residual copper, lead, zinc and iron impurities remaining after the aqueous leaching step. Of the various sulfur compounds that can be satisfactorily employed including $$(NH_4)_2S_x,$$

$H_2S$ and $(NH_4)_2S$, ammonium sulfide constitutes a preferred material. The sulfur compounds when used are present in a concentration so as to provide a sulfide ion concentration of from about twice up to about three times the stoichiometric amount needed and which will vary within the aforementioned range in consideration of the quantity of contaminating metals present.

The quantity of $MoO_3$ present in the ammoniacal leach is at high concentration level to minimize the volume of resultant leach liquor which must be evaporated to recover the ammonium molybdate product. Particularly satisfactory results have been obtained employing a liquid-to-solid ratio of about 2:1. The duration of the ammonical leaching step will vary depending upon the specific concentration of solids, the composition and temperature of the ammoniacal leaching solution, and the particle size and magnitude of agitation of the solids during the leaching step. Usually, leaching durations ranging from about four hours up to about 16 hours, and preferably around 16 hours, have been found satisfactory for effecting a leaching of substantially all of the molybdenum values in the solid residue. This also oxidizes the soluble ferrous ion and precipitates $Fe(OH)_3$, which coprecipitates phosphates, arsenates, lead hydroxide and aluminum hydroxide and is filtered out with the insoluble gangue.

The slurry, as shown in FIG. 1, is transferred from the reactor to a filter and the residual filter cake after washing with additional ammoniacal solution is discharged to waste. The filtrate, in combination with the wash solution, is thereafter transferred to an evaporator in which crystallization of the dissolved ammonium molybdate is effected and which can be recovered as a high purity product. Alternatively, as shown in FIG. 1, the ammonium molybdate product can be subjected to a further calcining operation at a temperature sufficiently high to effect a decomposition of the ammonium molybdate crystals and a liberation of the ammonia, thereby leaving a residual high purity molybdenum trioxide product. The ammonia may conveniently be recycled to the reactor for use in the prior ammoniacal leaching step. Usually, calcining temperatures ranging from about 400° C. up to about 600° C. have been found satisfactory for this purpose and require periods ranging from a fraction of an hour up to several hours to effect a substantially complete conversion of the ammonium molybdate to the molybdenum trioxide product employing either batch or continuous type calcining equipment.

In accordance with an alternative embodiment of the present invention, and referring now in detail to FIG. 2, a process is schematically illustrated in which cation exchange resins are employed during the initial aqueous leaching step to extract the predominant portion of contaminating alkali metal cations and other contaminating cations present in the roasted concentrate. As noted in FIG. 2, the ore as mined is processed to form a molybdenum disulfide concentrate by flotation extraction techniques, whereafter a roasting thereof is performed in a manner as previously described in connection with the process of FIG. 1. The roasted concentrate, as before, is subjected to a hot aqueous leaching at a solids concentration of from about 30% to about 50%, and preferably at a liquid-to-solids ratio of about 2:1. The hot aqueous leaching step is performed so as to effect a solubilizing of the alkali metal and other metal contaminants present in the roasted concentrate and which contaminating cations are extracted from the aqueous leach solution by a cation exchange resin. A variety of cation exchange resins well known in the art can be satisfactorily employed for this purpose including the following: Dowex HCR, HDRW, AG50W-X8, Rohm & Haas Amberlite 200, Amberlite IRC-50.

A contact of the aqueous leach solution with the cation exchange resin can be achieved by employing a particulated or pelletized resin of a particle size greater than that of the roasted concentrate, such as, for example, from about 400 mesh up to about 10 mesh which readily is admixed with the slurry comprised of the aqueous leach solution and roasted concentrate and maintained in appropriate suspension by means of agitation. After the leaching step has been completed, which may range from a fraction of an hour up to about two hours, the resin particles can readily be separated by a screening or settling operation and a resultant slurry or pulp transferred to a reactor as shown in FIG. 2. Alternatively, the ion exchange resin can be in the form of a porous bed over or through which the leaching solution and roasted concentrate particles pass in intimate contact therewith to effect an extraction of an alkali metal and other contaminating cations therefrom.

As will be noted from a comparison of the processes illustrated in FIGS. 1 and 2, the use of the cation exchange resin during the aqueous leaching step eliminates the recovery of the solubilized molybdenum employing lime to produce a calcium molybdate product. Instead, the loaded resin is transferred to a regeneration station at which the contaminating adsorbed cations are eluated in accordance with well known techniques and the resin can be recycled to the leaching operation for reuse.

The pulp, as shown in FIG. 2, derived from the aqueous leaching and screening operation is transferred to a reactor in which ammonia gas or ammonium hydroxide is introduced to effect a solubilizing and a leaching of the molybdenum constituent in the concentrate to form ammonium molybdate in the same manner as previously described. As also noted, a sulfur compound, such as ammonium sulfide, can be introduced during the ammoniacal leaching step to still further reduce the quantity of any residual copper and iron remaining in the leached concentrate.

The leached concentrate is thereafter filtered and crystallized in a manner as previously described to produce an ammonium molybdate product or, alternatively, is calcined to produce a high purity molybdenum trioxide product.

In order to further illustrate the features of the present invention, the following detailed examples are provided. It will be understood that the examples are included for illustrative purposes and are not intended as being restrictive of the scope of this invention as herein described and as set forth in the subjoined claims.

EXAMPLE I

A molybdenite concentrate was prepared and roasted in a manner to provide a roasted concentrate corresponding to Sample A previously described. A 75 gram quantity of the roasted concentrate was leached with 150 ml. of de-ionized water at a temperature of 80° C. for a period of one hour. The slurry had a solid concentration of about 33%. The slurry thereafter was filtered and washed with hot de-ionized water, producing a composite filtrate of 330 ml. The washed filter cake was thereafter leached with a 10% concentration of an aqueous ammonia leach solution at an ambient temperature and at a 17% solids concentration for a period of about 16 hours. After the conclusion of the leaching step, the residual or undissolved residue was filtered and the filter cake was washed with hot de-ionized water. The resultant solid residue was dried and weighted. The filtrate, in turn, along with the de-ionized wash, was evaporated and crystallized to a high purity ammonium molybdate.

A total of 77.9 grams of ammonium molybdate was recovered which analyzed as containing 55.43% molybdenum, 48 p.p.m. copper, 35 p.p.m. magnesium and only trace amounts of aluminum, sodium and potassium. The aqueous leach filtrate had a concentration of dissolved molybdenum equal to 5.65 grams per liter and a potassium concentration of 560 p.p.m. The dried residue from the ammoniacal leaching step totaled 8.3 grams and contained 1.8% molybdenum and 4100 p.p.m. potassium.

The solubilized molybdenum in the aqueous leach solution is recovered by adding two to three times the stoichiometric amount of calcium oxide to the liquor to effect a precipitation of calcium molybdate. The precipitate is recovered by filtration, washed with de-ionized water and dried. The total recovery of the molybdenum constituent present in the original feed in the form of ammonium molybdate and calcium molybdate is greater than 99.7%.

EXAMPLE II

A 75 gram amount of a Sample A roasted concentrate was leached with 150 ml. of de-ionized water containing 1% nitric acid. The aqueous leaching was carried out for a period of eight hours at a solution temperature of 80° C. and a solids concentration of 33%. The resultant slurry thereafter was filtered and the filter cake washed with 230 ml. of hot de-ionized water containing a 1% concentration of nitric acid. The wash and filtrate were combined and totaled 380 ml. containing 6.04 grams per liter of dissolved molybdenum and 450 p.p.m. potassium.

The filter cake was thereafter subjected to an ammoniacal leaching employing a de-ionized aqueous solution containing a 10% concentration of ammonia and a solids concentration of 17%. The leaching was carried out at ambient temperature for a period of 16 hours, whereafter the solution was filtered and the filter cake washed with hot de-ionized water. The filter cake was subsequently dried and weighted and comprised 7.9 grams, which analyzed as containing 0.048% molybdenum and 4500 p.p.m. potassium. A total of 75.5 grams of high purity ammonium molybdate were recovered which analyzed as containing 56.59% molybdenum, 24 p.p.m. copper, 33 p.p.m. magnesium, 150 p.p.m. potassium and only trace amounts of aluminum and sodium.

The molybdenum constituent in the aqueous acid leach filtrate is recovered by adding two to three times the stoichiometric amount of lime thereto to effect a precipitation of calcium molybdate which is recovered by filtration. The resultant calcium molybdate product, after washing and drying in combination with the molybdenum recovered in the form of a high purity ammonium molybdate, represented 99.9% of the original molybdenum introduced in the roasted feed concentrate.

EXAMPLE III

A 75 gram sample of a roasted molybdenum oxide concentrate containing 179 p.p.m. copper, 50 p.p.m. magnesium and 350 p.p.m. potassium as contaminating constituents was leached with 150 ml. of de-ionized water containing 1% nitric acid for a period of four hours at 80° C. The filter cake was washed with 280 ml. of a 1% solution of nitric acid and thereafter was leached with 330 ml. of a 12% ammonium hydroxide solution for a period of 16 hours at ambient temperature. The resultant slurry was filtered and the solid residue was washed. The combined wash and filtrate was evaporated and crystallized to recover a high purity ammonium molybdate. The ammonium molybdate product recovered contained only 9 p.p.m. copper and 10 p.p.m. magnesium. The solid residue remaining after the ammoniacal leaching step comprised only two grams which contained 2.74% molybdenum, 41 p.p.m. copper and 500 p.p.m. magnesium. The aqueous acid leach solution contained 0.65 grams of molybdenum per liter, 27 p.p.m. copper and 11 p.p.m. magnesium. This test clearly substantiates the production of a high purity ammonium molybdate containing only minimal quantities of copper and magnesium contaminants without necessitating the use of a sulfur compound, such as ammonium sulfide, during the ammoniacal leaching step.

EXAMPLE IV

A 75 gram amount of a Sample A roasted concentrate was leached with 150 ml. of de-ionized water containing 1% nitric acid. The aqueous leaching was carried out for a period of eight hours at a solution temperature of 80° C. and a solids concentration of 33%. The resultant slurry thereafter was filtered and the filter cake washed with 230 ml. of hot de-ionized water containing a 1% concentration of nitric acid. The wash and filtrate were combined and totaled 380 ml. containing 6.04 grams per liter of dissolved molybdenum and 450 p.p.m. potassium. To this filtrate was added 50 grams of a cation exchange resin and the mixture was gently stirred for 16 hours. The resins were then screened out and the solution combined with the $NH_4OH$ filtrate which was then dead-end crystallized to ammonium molybdate, which analyzed as containing nil K and 18 p.p.m. Cu.

While it will be apparent that the description of the preferred embodiments of the process comprising the present invention will achieve the benefits as herein set forth, the invention is susceptible to modification, variation and change without departing from the spirit thereof.

What is claimed is:

1. A process for producing a high purity molybdenum product which comprises the steps of extracting a molybdenite ore to produce a particulated concentrate having an average particle size of less than about 200 mesh and consisting predominantly of $MoS_2$, oxidizing said concentrate to convert substantially all of the $MoS_2$ to molybdenum oxide, contacting the oxidized said concentrate with an aqueous leach solution at a temperature ranging from about 10° C. up to 100° C. forming a slurry containing up to about 50% solids for a period of time sufficient to extract at least a portion of the contaminating metals including copper, potassium, magnesium, aluminum, sodium and iron from said concentrate, contacting said aqueous leach solution with a cation exchange resin for adsorbing the extracted said contaminating metals from said solution in the form of a loading on said resin, separating the aqueous leached said concentrate from the loaded said resin and said aqueous leach solution, contacting the separated said concentrate with an aqueous ammoniacal leach solution at a temperature ranging from about 25° C. up to about 100° C. and containing about 5% to about 30% ammonia for a period of time sufficient to convert substantially all of said molybdenum oxide therein to a soluble ammonium molybdate compound, separating the remaining solid residue from said ammoniacal leach solution and thereafter crystallizing said solution and recovering a high purity ammonium molybdate product.

2. The process as defined in claim 1, wherein the contacting of the separated said concentrate with said aqueous ammoniacal leach solution to convert substantially all of said molybdenum oxide therein to a soluble ammonium molybdate compound is carried out in the presence of reactive free oxygen to further oxidize any soluble ferrous ions present to the ferric state and effecting a precipitation of ferric hydroxide which coprecipitates phosphates, arsenates, lead hydroxide and aluminum hydroxide.

3. The process as defined in claim 1, including the further step of calcining said ammonium molybdate product and recovering a high purity molybdenum oxide product.

4. The process as defined in claim 1, wherein said aqueous leach solution contains from about 1% to about 10% of a mineral acid selected from the group consisting of hydrochloric acid, nitric acid, sulfuric acid and mixtures thereof.

5. The process as defined in claim 1, wherein said concentrate contains at least about 85% molybdenum disulfide.

6. The process as defined in claim 1, wherein said aqueous ammoniacal leach concentration is at a temperature ranging from about 25° C. to about 75° C.

7. The process as defined in claim 1, in which the aqueous ammoniacal leaching step of said concentrate is carried out in the presence of sulfide compounds at a concentration greater than a stoichiometric amount of sulfied ion required to effect a precipitation of any contaminating copper, lead and zinc ions in the form of an insoluble sulfide.

8. The process as defined in claim 7, in which the sulfur compound is ammonium sulfide present in a concentration of from about two times to about three times the stoichiometric amount required.

9. The process as defined in claim 1, wherein the solids concentration of said concentrate in said aqueous leach solution ranges from about 33% to about 40%.

10. The process as defined in claim 1, wherein said aqueous leach solution contains from about 1% to about 5% nitric acid and is at a temperature of from about 20° C. to about 85° C.

11. The process as defined in claim 1, including the further step of separating the loaded said resin from said aqueous leach solution and eluting the contaminating metals adsorbed thereon to effect a regeneration of said resin and thereafter recycling the regenerated said resin for reuse in the extraction of further contaminating metals from said aqueous leach solution.

References Cited

UNITED STATES PATENTS

| | | | |
|---|---|---|---|
| 2,017,557 | 10/1935 | Winkler et al. | 423—53 |
| 3,458,277 | 7/1969 | Platzke et al. | 423—54 |
| 1,952,459 | 3/1934 | Pokorny | 423—53 |
| 3,674,424 | 7/1972 | Stanley et al. | 423—53 |
| 3,739,057 | 6/1973 | Daugherty et al. | 423—56 |
| 3,694,147 | 9/1972 | Drobnish et al. | 423—53 |
| 3,714,325 | 1/1973 | Bloom et al. | 423—53 |

FOREIGN PATENTS

| | | | |
|---|---|---|---|
| 331,472 | 7/1930 | Great Britian | 423—61 |

HERBERT T. CARTER, Primary Examiner

U.S. Cl. X.R.

423—56, 58, 61, 593, 606, 127, 140, 92, 101, 37